United States Patent
Bystrom

[15] 3,687,254
[45] Aug. 29, 1972

[54] CENTRIFUGAL CLUTCH

[72] Inventor: Roy H. Bystrom, 6115 N. Ravenswood, Chicago, Ill. 60625

[22] Filed: Sept. 16, 1970

[21] Appl. No.: 72,679

[52] U.S. Cl. ......192/105 A, 192/103 B, 192/105 BA
[51] Int. Cl. .............................................F16d 43/24
[58] Field of Search ........192/105 A, 103 B, 105 BA, 192/105 CD

[56] References Cited

UNITED STATES PATENTS

| | | | |
|---|---|---|---|
| 2,048,372 | 7/1936 | Carlsson et al. | 192/105 A |
| 2,504,177 | 4/1950 | Bruestle | 192/105 B |
| 1,859,963 | 5/1932 | Futscher | 192/105 A |
| 3,461,994 | 8/1969 | Dallman et al. | 192/105 BA |
| 2,517,955 | 8/1950 | Zimmerman | 192/105 A |

*Primary Examiner*—Benjamin W. Wyche
*Assistant Examiner*—Randall Heald
*Attorney*—Jacque L. Meister

[57] ABSTRACT

A slip clutch having a drum secured to the driven shaft is driven by an externally powered carrier. The carrier is supported on bearings and turns freely about the shaft. The carrier supports a pair of drive shoes secured together by springs which tend to prevent the shoes from engaging the drum. Means are provided for adjusting the mass of each drive shoe from the exterior of the drum to enable adjustment of the centrifugal force acting upon each shoe as it and the carrier are rotated. By this means, the rotational speed at which clutch engagement occurs, is made selectively adjustable.

5 Claims, 3 Drawing Figures

INVENTOR.
ROY H. BYSTROM

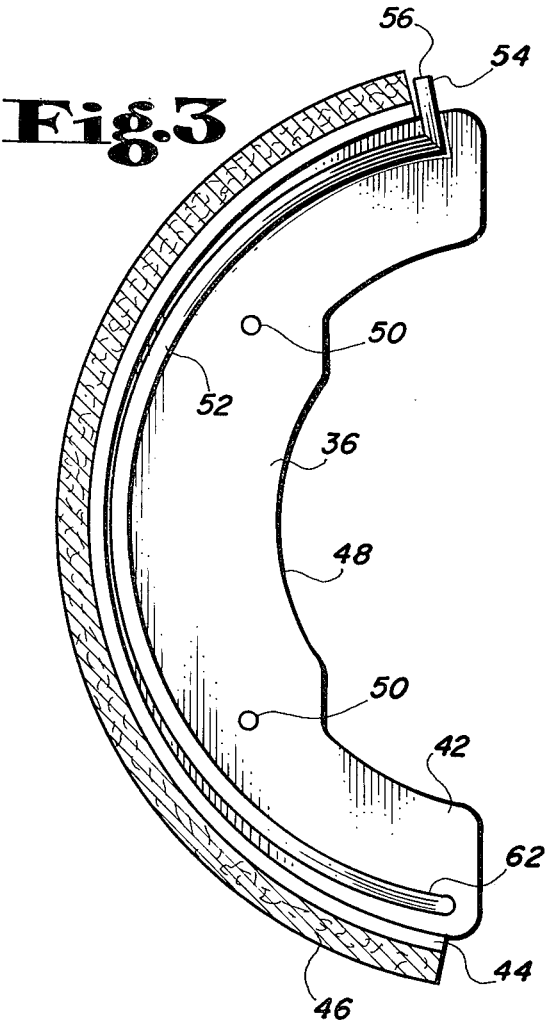

CENTRIFUGAL CLUTCH

BACKGROUND OF THE INVENTION

The field of the invention is generally that of centrifugal clutches and more particularly is improvements in centrifugal clutches to facilitate adjustment of the speed at which the clutch engages.

There exist today, a large number of applications where small engines provide motive power to the driven device. In these devices it is necessary that the load be disengaged during engine start-up and while warming up or idling. Mechanical centrifugal clutches or fluid couplings are most often used to accomplish this selective disengagement when automatic operation is desired. However, both of these devices are either very difficult or impossible to adjust with respect to the point of engagement and additionally, the fluid couplings even at high input speed have some slip. In many applications this inability to readily adjust the engagement point is a serious disadvantage since it necessarily results in performance compromises in the using device. While in some applications these compromises may not be a serious detriment, in others where maximum performance is necessary, the performance compromises of conventional centrifugal clutches make them totally unacceptable. Among the applications requiring maximum performance are those involving racing vehicles such as "go-karts" and various cycles.

SUMMARY OF THE INVENTION

It is accordingly an object of the invention to provide a reliable centrifugal clutch which overcomes the above noted limitations of the prior art and whose engagement speed is precisely adjustable. It is a principal object of the invention that the means for adjusting the engagement speed be easily accessible from the exterior of the clutch without any need to disassemble the clutch to effect the adjustment.

These and other objects of the invention are achieved by having an output drum affixed to the driven member. The driving member of the clutch is a carrier having one or more friction members arranged to move outward to engage the drum interior under the impetus of centrifugal force. Except when the friction members engage the drum, there is no connection between the carrier and drum and the carrier then rotates freely within and coaxially with the drum. Means are provided for adjusting the mass of the friction members without disassembling the clutch.

DESCRIPTION OF THE DRAWINGS

FIG. 3 is an enlarged view of one of the friction members shown in FIG. 2.

DESCRIPTION OF THE PREFERRED EMBODIMENTS

Figure 1:
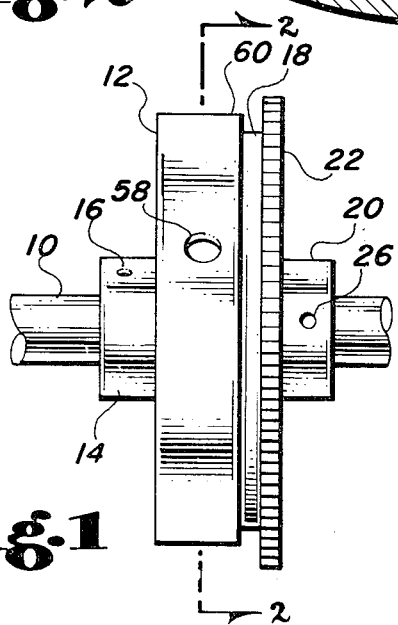
FIG. 1 is an external view of the clutch of the invention.

In FIG. 1, the clutch is shown assembled to the driven shaft 10. Drum 12 with its integral hub 14 is secured to shaft 10 by any suitable fastener such as the taper pin 16 that is shown. Carrier 18 is assembled coaxially the shaft 10 on bearings 24 (FIG. 2) for free rotation thereabout. Collar 20 secures the carrier from lateral movement along shaft 10 while thrust washers (not shown) assembled between the hub 14 of the drum and the hub 28 of the carrier control clearance between the two. Collar 20 is secured in position on shaft 10 by means of set screw 26. This system for controlling clutch end play is preferred for its adaptability to various application. However, when large volume usage of a single application occurs, for cost reasons preferred construction then substitutes a groove in the shaft 10 plus use of various thickness retaining rings for use in place of the collar 20.

Driving power is applied to the clutch from any suitable external power source such as an internal combustion engine. In the embodiment of FIG. 1, a sprocket 22 is provided to enable connection to such an engine. Manifestly however, any other suitable connecting means including a pulley could be used without affecting the clutch itself. In still other applications, the carrier is directly driven by the engine and power take off is from the shaft 10.

Figure 2:
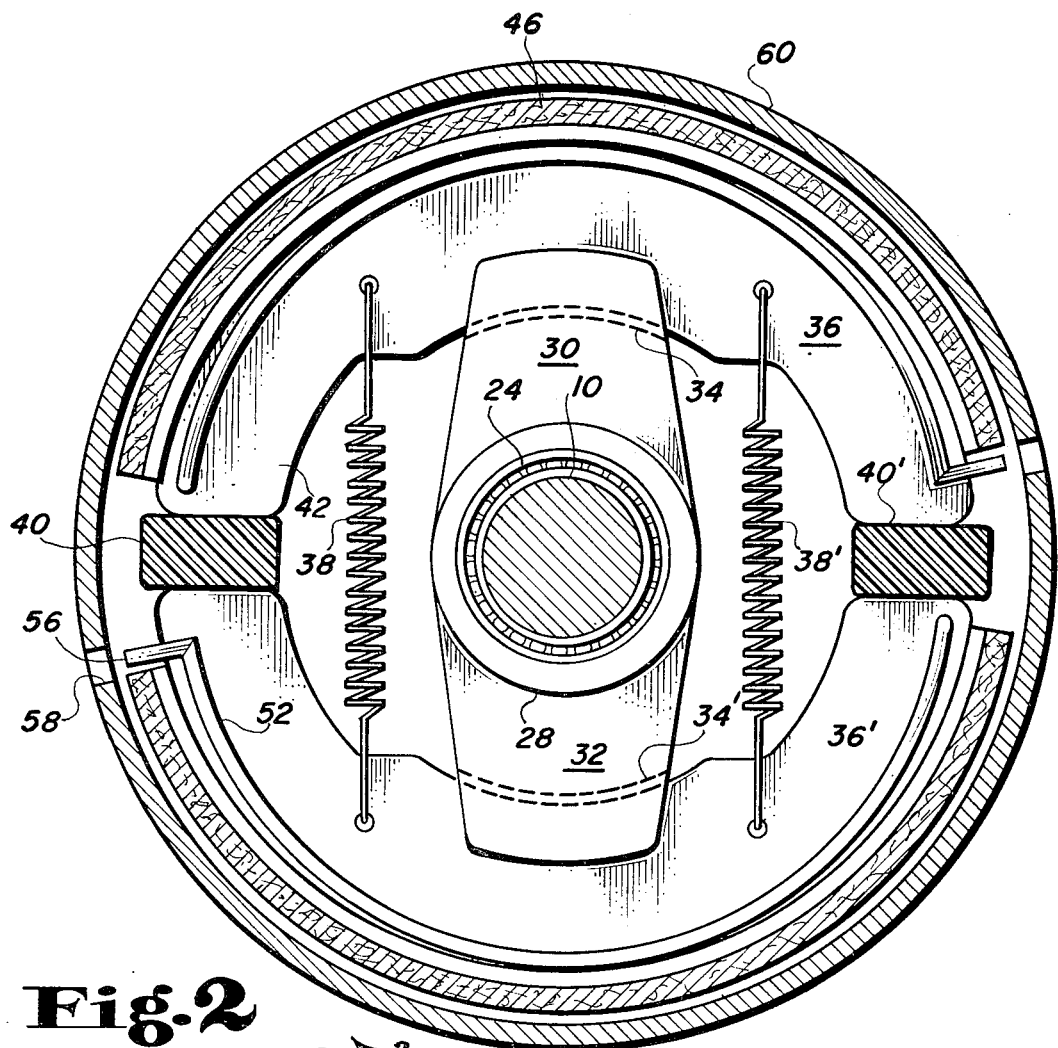
FIG. 2 is a vertical section through FIG. 1 taken substantially along line 2—2 therein and at an enlarged scale relative thereto.

In FIG. 2 the carrier, together with friction members and associated parts are shown in enlarged scale in a view taken along section 2—2 of FIG. 1. Carrier 18 is generally disc-like and is possessed of considerable strength to enable efficient power transmission without buckling. Upstanding from the disc are various structural features used to permit clutch operation. Among these are hub 28 into which bearing 24 is pressed to enable free rotation of the carrier about shaft 10. Strengthening ribs 30 and 32 are also an integral part of the carrier and by slotting their ends as indicated at 34, are made to perform the additional function of guiding friction members 36 and 36' as they alternately move inward toward the hub and outward toward the drum. Obviously, other guide means such as clips or slots in the centered hub or even no guide means can be used in place of slots 34. Secured to carrier 18 are two stops 40 and 40' whose purpose will be made more clear in discussion which follows. Thus far, either steel or cloth filled melamines have proven to be the best materials for the stops since their impact resistance is great; they can have a low coefficient of friction and they wear well without galling.

As shown, two friction members 36 and 36' are used in the preferred embodiment. The two members are identical and are shown in greater detail in FIG. 3. As shown, member 36 is assembled into the slot 34 in rib 30 and member 36' into the slot 34' in rib 32. The two members are retained in position by tension springs 38 and 38' which are as nearly identical as possible. The twin extension springs tend to hold the friction members against the stops 40 and 40' and away from contact with the drum 12. While the springs 38 and 38' are shown connected between the friction members, in certain embodiments (not shown), the springs are fastened to anchors on the carrier, instead.

The friction members 36 and 36' comprise an arcuate support member 42 having an upturned flange 44 to which is secured friction facing material 46. Support member 42 has a central region 48 of reduced inner diameter for engagement in the slots of ribs 30 or 32 and has holes 50 for anchoring the springs 38 and 38'. A special feature of the invention is the ability to adjust the mass of the friction members without disassembly of the clutch. As is well-known, the centrifugal force tending to urge the friction members outward, is directly proportional to their mass. Thus, increasing the mass will increase the centrifugal force acting at any given angular speed and hence decrease the angular speed at which clutch engagement will occur. The effect is identical but opposite for decreasing mass.

To achieve the adjustable mass, there is provided an arcuate shaped tube 52 whose maximum radius is chosen to place the tube as far outwardly as possible and preferably against upturned flange 44. The tube is closed at one end 62 as by soldering or by deforming and is secured to support member 42 as by brazing. The opposite end of the tube is provided with a right angle fitting 54 in such a manner that internal tube diameter is not constricted. The outermost edge of fitting 54 is internally tapped for a set screw 56 and extends outwardly to the wear limit of facing material 46. As shown in both FIG. 1 and 2, an access hole 58 is provided in the annular flange 60 of drum 12. This hole is positioned laterally on the flange to enable its alignment with set screw 56. Thus, the screw 56 can be brought into alignment with the hole 58, the screw removed and weights in the form of slugs or BB's added or removed, all without disassembly of the clutch.

In operation, as carrier 18 increases in speed, the BB's in each tube tend to cluster at the trailing edge of each tube. With the mass thus non-uniformly distributed, the end of the friction member with the mass concentration will be the first to contact the drum. This partial engagement yields smooth "pick-up" of the load. As rotational speed continues to increase, the amount of friction material area in contact with the drum also increases. Finally when all of the available friction material is in contact with the drum, the BB's in the tube tend to center themselves at the point of maximum tube radius. In certain embodiments it has been desirable to improve distribution of the weights in the tube during acceleration of the clutch, usually for the purpose of minimizing friction between the support member 42 and stops 40 and 40'. In this case, the tube 52, is constructed with a slightly smaller radius than the internal radius of flange 44, and the center of the tube is secured against the flange and with each end disposed proportionally radially inward.

When the primary consideration is maximizing transmitted torque and minimizing wear of the facing material 46 instead of smooth load pick-up, the tube 52 is maintained substantially full. In this case mass adjustments are made by increasing or decreasing the quantity of heavy slugs or BB's at the expense of light slugs or BB's. By using steel BB's each of 1 gram weight interspersed with polyethylene BB's of less than a tenth that weight, it has been found that mass adjustments can easily be made. Under these conditions it has proved advantageous to disperse the heavy BB's among the lighter ones as uniformly as possible.

In the foregoing description of the means for adjusting mass, a presently preferred construction using a tube 52 and BB's or slugs has been described. However, in one alternate construction which has also proven useful, heavy liquids such as mercury are introduced into the tube to adjust the mass. Further, while one tube per friction member is ordinarily sufficient, plural tubes of various lengths to suit the application, are also useful.

From the foregoing description of the preferred embodiments of the invention, it is apparent that many different embodiments of the invention may be made without departing from the spirit and scope thereof. Therefore, it is not intended that the invention be limited except as indicated in the appended claims.

What is claimed is:

1. An improved shaft mounted automatic centrifugal clutch having means for adjusting the engagement speed of said clutch from the exterior of said clutch comprising
   drum means secured to said shaft for rotation therewith, said drum means having an annular flange with an access hole therethrough,
   carrier means mounted within said annular flange for free rotation about said shaft,
   arcuate friction member means guided by said carrier means and restrained from outward motion by spring means, said friction member being positioned interior of and adapted to frictionally engage said annular flange of said drum means, and
   mass adjusting means secured to said friction member, said mass adjusting means comprising an arcuate tube closed at one end and selectively openable at the other, said selectively openable end being disposed to permit its alignment with said access hole, whereby the amount of mass interior of said tube can be varied from the exterior of said clutch.

2. The improved shaft mounted clutch in accord with claim 1 wherein the mass interior of said tube is comprised of selected numbers of weights.

3. The improved shaft mounted clutch in accord with claim 2 wherein said weights are selected from those made of various densities.

4. An improved shaft mounted automatic centrifugal clutch having means for adjusting the engagement speed of said clutch, comprising
   drum means secured to said shaft for rotation therewith, said drum means having an annular flange,
   carrier means mounted within said annular flange for free rotation about said shaft,
   arcuate friction member means guided by said carrier means and restrained from outward motion by spring means, said friction member being positioned interior of and adapted to frictionally engage said annular flange of said drum means, and
   mass adjusting means secured to said friction member, said mass adjusting means comprising an arcuate tube secured to said friction member, said tube being permanently closed at one end and selectively openable at the other, the mass interior of said tube being comprised of selected numbers of weights, said openable end of said tube being disposed on a radius of said friction member and said annular flange of said drum means having a hole therethrough laterally disposed to permit its alignment with said openable end of said tube.

5. An improved shaft mounted clutch in accord with claim 4 wherein
   said arcuate friction member means consists of two arcuate friction members, each faced with friction facing material, said spring means comprises tension spring means, and said openable end of said tube means is formed to extend radially outward to terminate at the wear limit of said friction facing material.

* * * * *